(12) United States Patent
Longenecker

(10) Patent No.: US 11,808,466 B2
(45) Date of Patent: Nov. 7, 2023

(54) AIR CONDITIONER WITH VARIABLE SPEED COMPRESSOR AND VARIABLE SPEED FAN

(71) Applicant: Haier US Appliance Solutions, Inc., Wilmington, DE (US)

(72) Inventor: Joshua Duane Longenecker, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/568,115

(22) Filed: Jan. 4, 2022

(65) Prior Publication Data

US 2023/0213229 A1    Jul. 6, 2023

(51) Int. Cl.
| | | |
|---|---|---|
| F24F 11/41 | (2018.01) | |
| F24F 11/65 | (2018.01) | |
| F24F 11/77 | (2018.01) | |
| F24F 11/85 | (2018.01) | |
| F25B 47/00 | (2006.01) | |
| F24F 110/12 | (2018.01) | |

(52) U.S. Cl.
CPC .............. *F24F 11/41* (2018.01); *F24F 11/65* (2018.01); *F24F 11/77* (2018.01); *F24F 11/85* (2018.01); *F25B 47/006* (2013.01); *F24F 2110/12* (2018.01); *F25B 2313/0294* (2013.01); *F25B 2313/02741* (2013.01); *F25B 2313/0314* (2013.01); *F25B 2313/0315* (2013.01); *F25B 2500/12* (2013.01); *F25B 2600/0253* (2013.01); *F25B 2700/2106* (2013.01)

(58) Field of Classification Search
CPC .. F24F 11/41; F24F 11/65; F24F 11/77; F24F 11/85; F24F 2110/12; F25B 47/006; F25B 2313/02741; F25B 2313/0294; F25B 2313/0314; F25B 2313/0315; F25B 2500/12; F25B 2600/0253; F25B 2700/2106
See application file for complete search history.

(56) References Cited

U.S. PATENT DOCUMENTS

| | | | |
|---|---|---|---|
| 5,062,276 A | 11/1991 | Dudley | |
| 5,144,812 A | 9/1992 | Mills, Jr. | |
| 11,255,558 B1 * | 2/2022 | Kraft | F24F 11/64 |

(Continued)

FOREIGN PATENT DOCUMENTS

| | | |
|---|---|---|
| CN | 1991264 B | 6/2010 |
| CN | 104653444 B | 5/2017 |
| JP | H01150732 A | 6/1989 |

OTHER PUBLICATIONS

Annotated version of Kraft U.S. Pat. No. 11,255,558-B1 (Year: 2022).*

*Primary Examiner* — Marc E Norman
*Assistant Examiner* — Matthew John Moscola
(74) *Attorney, Agent, or Firm* — Dority & Manning, P.A.

(57) ABSTRACT

Air conditioner units and methods of operating the same are provided. A method of operating an air conditioner unit includes determining a fan speed as a function of a compressor speed of a variable speed compressor of the air conditioner unit. The method also includes activating a variable speed fan of the air conditioner unit at the fan speed. An air conditioner unit may include a controller, and the controller may be configured for performing the method.

16 Claims, 3 Drawing Sheets

(56) References Cited

U.S. PATENT DOCUMENTS

| | | | | |
|---|---|---|---|---|
| 2011/0083454 A1* | 4/2011 | Kopko | ............ | F25B 49/027 62/181 |
| 2012/0060530 A1 | 3/2012 | Shimoda | | |
| 2021/0207842 A1* | 7/2021 | Akella | ............ | F24F 1/0011 |
| 2021/0356155 A1* | 11/2021 | Yoshimi | ............ | F25B 49/02 |

* cited by examiner

AIR CONDITIONER WITH VARIABLE SPEED COMPRESSOR AND VARIABLE SPEED FAN

FIELD OF THE INVENTION

The present subject matter relates generally to air conditioning appliances, and more particularly to air conditioning appliances having a variable speed compressor and at least one variable speed fan.

BACKGROUND OF THE INVENTION

Air conditioner units or air conditioning appliance units are conventionally utilized to adjust the temperature within structures such as dwellings and office buildings. In particular, one-unit type room air conditioner units, such as single-package vertical units (SPVU), or package terminal air conditioners (PTAC) may be utilized to adjust the temperature in, for example, a single room or group of rooms of a structure. A typical one-unit type air conditioner or air conditioning appliance includes an indoor portion and an outdoor portion. The indoor portion generally communicates (e.g., exchanges air) with the area within a building, and the outdoor portion generally communicates (e.g., exchanges air) with the area outside a building. Accordingly, the air conditioner unit generally extends through, for example, an outer wall of the structure. Generally, a fan may be operable to rotate to motivate air through the indoor portion. Another fan may be operable to rotate to motivate air through the outdoor portion. A sealed cooling system including a compressor is generally housed within the air conditioner unit to treat (e.g., cool or heat) air as it is circulated through, for example, the indoor portion of the air conditioner unit. One or more control boards are typically provided to direct the operation of various elements of the particular air conditioner unit.

In some air conditioner units, the fans may be variable speed fans capable at operation over a range of speeds, e.g., rotating at a selected speed within the operating range of the fan. The compressor may also be a variable speed compressor capable of operating at a selected speed within a range of operating speeds. In such units, if the fan speed does not match the compressor speed, the unit may draw excess power and/or the unit may not achieve adequate dehumidification.

As a result, further improvements to air conditioners may be advantageous. In particular, it would be useful to provide coordinated or matching fan speeds and compressor speeds in air conditioner units that have a variable speed compressor and one or more variable speed fans.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating an air conditioner unit is provided. The method includes determining a fan speed as a function of a compressor speed of a variable speed compressor of the air conditioner unit and activating a variable speed fan of the air conditioner unit at the fan speed.

In another exemplary aspect of the present disclosure, an air conditioner unit is provided. The air conditioner unit includes a housing defining an outdoor portion and an indoor portion. An outdoor heat exchanger is disposed in the outdoor portion. An indoor heat exchanger is disposed in the indoor portion. The air conditioner unit also includes a variable speed compressor in fluid communication with the outdoor heat exchanger and the indoor heat exchanger to circulate a refrigerant between the outdoor heat exchanger and the indoor heat exchanger. The air conditioner unit further includes a controller. The controller is configured for determining a fan speed as a function of a compressor speed of the variable speed compressor of the air conditioner unit and activating a variable speed fan of the air conditioner unit at the fan speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
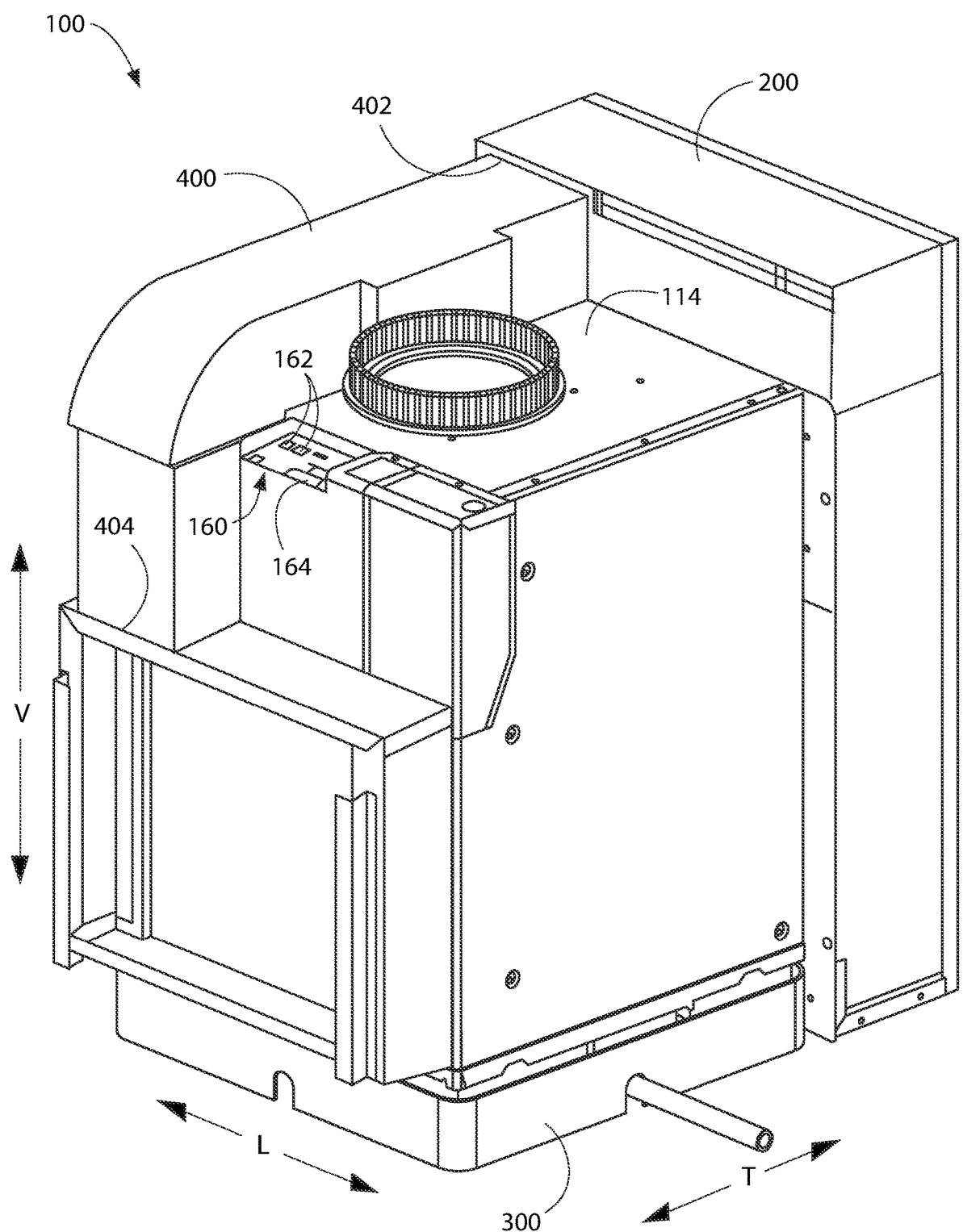
FIG. 1 provides a perspective view of an air conditioner unit according to one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
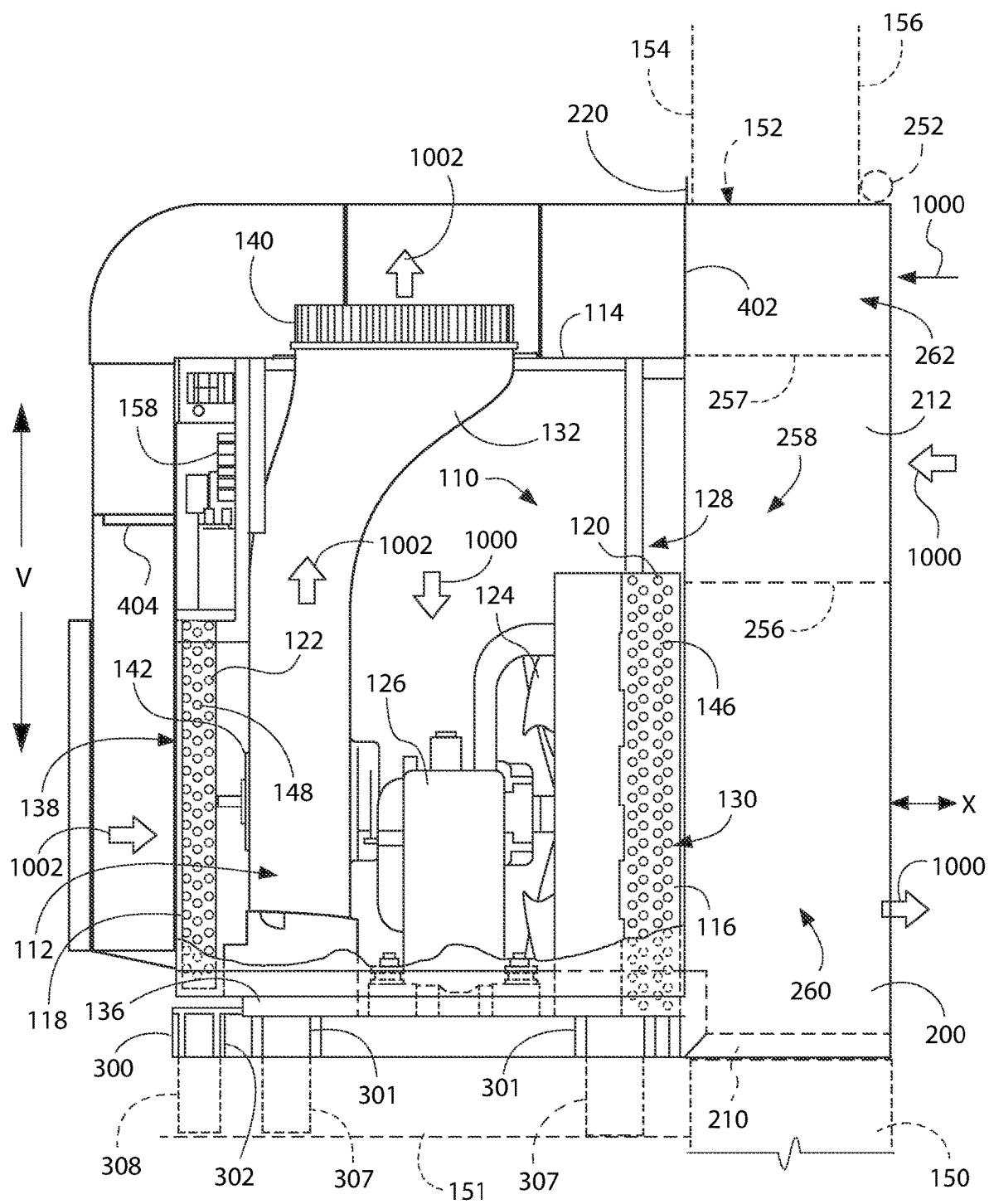
FIG. 2 provides a section view of the air conditioner unit of FIG. 1 according to one or more exemplary embodiments of the present disclosure.

Turning now to the figures, FIGS. 1 and 2 illustrate an exemplary air conditioner appliance or air conditioner unit (e.g., air conditioner 100). As shown, air conditioner 100 may be provided as a one-unit type air conditioner 100, such as a single-package vertical unit. Air conditioner 100 includes a package housing 114 supporting an indoor portion 112 and an outdoor portion 110.

Generally, air conditioner 100 defines a vertical direction V, lateral direction L, and transverse direction T. Each direction V, L, T is mutually perpendicular with every other direction, such that an orthogonal coordinate system is generally defined.

In some embodiments, housing 114 contains various other components of the air conditioner 100. Housing 114 may include, for example, a rear opening 116 (e.g., with or without a grill or grate thereacross) and a front opening 118 (e.g., with or without a grill or grate thereacross) may be spaced apart from each other along the transverse direction T. The rear opening 116 may be part of the outdoor portion 110, while the front opening 118 may be part of the indoor portion 112. Components of the outdoor portion 110, such as an outdoor heat exchanger 120, outdoor fan 124, and compressor 126 may be enclosed within housing 114 between front opening 118 and rear opening 116. In certain embodiments, one or more components are mounted on a base 136, as shown. The base 136 may be received on or within a drain pan 300.

During certain operations, air 1000 may be drawn to outdoor portion 110 through rear opening 116. Specifically, an outdoor inlet 128 defined through housing 114 may receive outdoor air 1000 motivated by outdoor fan 124. Within housing 114, the received outdoor air 1000 may be motivated through or across outdoor fan 124. Moreover, at least a portion of the outdoor air 1000 may be motivated through or across outdoor heat exchanger 120 before exiting the rear opening 116 at an outdoor outlet 130. It is noted that although outdoor inlet 128 is illustrated as being defined above outdoor outlet 130, alternative embodiments may reverse this relative orientation (e.g., such that outdoor inlet 128 is defined below outdoor outlet 130) or provide outdoor inlet 128 beside outdoor outlet 130 in a side-by-side orientation, or another suitable orientation.

As shown, indoor portion 112 may include an indoor heat exchanger 122, and an indoor fan 142, e.g., a blower fan 142 as in the illustrated example embodiment. These components may, for example, be housed behind the front opening 118. A bulkhead may generally support or house various other components or portions thereof of the indoor portion 112, such as the blower fan 142. The bulkhead may generally separate and define the indoor portion 112 and outdoor portion 110 within housing 114.

During certain operations, air 1002 may be drawn to indoor portion 112 through front opening 118. Specifically, an indoor inlet 138 defined through housing 114 may receive indoor air 1002 motivated by blower fan 142. At least a portion of the indoor air 1002 may be motivated through or across indoor heat exchanger 122 before passing to a duct 132. The indoor air 1002 may be motivated (e.g., by fan 142) into and through the duct 132 and returned to the indoor area of the room through an indoor outlet 140 defined through housing 114 (e.g., above indoor inlet 138 along the vertical direction V). Optionally, one or more conduits (not pictured) may be mounted on or downstream from indoor outlet 140 to further guide air 1002 from air conditioner 100. It is noted that although indoor outlet 140 is illustrated as generally directing air upward, it is understood that indoor outlet 140 may be defined in alternative embodiments to direct air in any other suitable direction.

Outdoor and indoor heat exchangers 120, 122 may be components of a thermodynamic assembly (i.e., sealed system), which may be operated as a refrigeration assembly (and thus perform a refrigeration cycle) or, in the case of the heat pump unit embodiment, a heat pump (and thus perform a heat pump cycle). Thus, as is understood, exemplary heat pump unit embodiments may be selectively operated to perform a refrigeration cycle at certain instances (e.g., while in a cooling mode) and a heat pump cycle at other instances (e.g., while in a heating mode). By contrast, exemplary A/C exclusive unit embodiments may be unable to perform a heat pump cycle (e.g., while in the heating mode), but still perform a refrigeration cycle (e.g., while in a cooling mode).

The sealed system may, for example, further include compressor 126 (e.g., mounted on base 136) and an expansion device (e.g., expansion valve or capillary tube—not pictured), both of which may be in fluid communication with the heat exchangers 120, 122 to flow refrigerant therethrough, as is generally understood. The outdoor and indoor heat exchangers 120, 122 may each include coils 146, 148, as illustrated, through which a refrigerant may flow for heat exchange purposes, as is generally understood.

A plenum 200 may be provided to direct air to or from housing 114. When installed, plenum 200 may be selectively attached to (e.g., fixed to or mounted against) housing 114 (e.g., via a suitable mechanical fastener, adhesive, gasket, etc.) and extend through a structure wall 150 (e.g., an outer wall of the structure within which air conditioner 100 is installed) and above a floor 151. In particular, plenum 200 extends along an axial direction X (e.g., parallel to the transverse direction T) through a hole or channel 152 in the structure wall 150 that passes from an internal surface 154 to an external surface 156. Optionally, a caulk bead 252 (i.e., adhesive or sealant caulk) may be provided to join the plenum 200 to the external surface 156 of structure wall 150 (e.g., about or outside from wall channel 152).

The plenum 200 includes a duct wall 212 that is formed about the axial direction X (e.g., when mounted through wall channel 152). Duct wall 212 may be formed according to any suitable hollow shape, such as conduit having a rectangular profile (shown), defining an air channel 210 to guide air therethrough. Moreover, duct wall 212 may be formed from any suitable non-permeable material (e.g., steel, aluminum, or a suitable polymer) for directing or guiding air therethrough. In certain embodiments, plenum 200 further includes an outer flange 220 that extends in a radial direction (e.g., perpendicular to the axial direction X) from duct wall 212. Specifically, outer flange 220 may extend radially outward (e.g., away from at least a portion of the axial direction X or the duct wall 212).

In some embodiments, plenum 200 includes a divider wall 256 within air channel 210. When assembled, divider wall 256 defines a separate upper passage 258 and lower passage 260. For instance, divider wall 256 may extend along the lateral direction L from one lateral side of plenum 200 to the other lateral side. Generally, upper passage 258 and lower passage 260 may divide or define two discrete air flow paths for air channel 210. When assembled, upper passage 258 and lower passage 260 may be fluidly isolated by divider wall 256 (e.g., such that air is prevented from passing directly between passages 258 and 260 through divider wall 256, or another portion of plenum 200). Upper passage 258 may be positioned upstream from outdoor inlet 128. Lower passage 260 may be positioned downstream from outdoor outlet 130.

The plenum 200 may further include a second divider wall 257 which separates a make-up air passage 262 from the remainder of the air channel 210, such as from the upper passage 258 and the lower passage 260. For example, the make-up air passage 262 may be positioned directly above the upper passage 258, whereby the second divider separates and partially defines the make-up air passage 262 and the upper passage 258, e.g., as in the exemplary embodiment illustrated in FIG. 2. Similar to the divider wall 256 described above, the second divider wall 257 may extend along the lateral direction L from one lateral side of plenum 200 to the other lateral side. The make-up air passage 262 may thereby define a discrete air flow path within air channel 210 which is separate and distinct from the upper and lower passages 258 and 260. When assembled, the make-up air passage 262 may be fluidly isolated by the second divider wall 257 from one or both of the upper passage 258 and lower passage 260, e.g., such that air is prevented from passing directly between the make-up air passage 262 and the upper and lower passages 258 and 260 through the second divider wall 257, or any other portion of plenum 200). The make-up air passage 262 may be positioned upstream from a make-up air duct 400. In some embodiments, outdoor air 1000 may be drawn into the make-up air duct 400 by a make-up air fan via the make-up air passage 262. The make-up air duct 400 may extend from a first end 402 at the make-up air passage 262 of the plenum 200 to a second end 404 at the indoor portion 112 of the housing 114, e.g., upstream of the indoor inlet 138, whereby outdoor air, e.g., make-up air, may be provided directly to the indoor portion 112 of the air conditioner 100 via the make-up air duct 400. Thus, the make-up air duct 400 may be a component of a make-up air system or make-up air assembly.

The operation of air conditioner 100 including compressor 126 (and thus the sealed system generally), indoor fan 142, outdoor fan 124, and other suitable components may be controlled by a control board or controller 158. Controller 158 may be in communication (via for example a suitable wired or wireless connection) to such components of the air conditioner 100. By way of example, the controller 158 may include a memory and one or more processing devices such as microprocessors, CPUs or the like, such as general or special purpose microprocessors operable to execute programming instructions or micro-control code associated with operation of air conditioner 100. The memory may be a separate component from the processor or may be included onboard within the processor. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 158 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Further, it should be understood that controllers 158 as disclosed herein are capable of and may be operable to perform any methods and associated method steps as disclosed herein.

Air conditioner 100 may additionally include a control panel 160 (FIG. 1) and one or more user inputs 162, which may be included in control panel 160. The user inputs 162 may be in communication with the controller 158. A user of the air conditioner 100 may interact with the user inputs 162 to operate the air conditioner 100, and user commands may be transmitted between the user inputs 162 and controller 158 to facilitate operation of the air conditioner 100 based on such user commands. A display 164 may additionally be provided in the control panel 160, and may be in communication with the controller 158. Display 164 may, for example be a touchscreen or other text-readable display screen, or alternatively may simply be a light that can be activated and deactivated as required to provide an indication of, for example, an event or setting for the air conditioner 100.

Also as may be seen in FIG. 2, in some instances when the plenum 200 is installed within the wall 150 above the floor 151, the remainder of the air conditioner unit 100 may be suspended or cantilevered from the plenum 200. In order to avoid such cantilever, one or more support legs 307 and/or 308 may be provided between the drain pan 300 and the floor 151, whereby at least some of the weight of the remaining components of the air conditioner unit 100 is shifted off of the plenum 200. Where the installation height of the plenum 200 above the floor 151 varies, the required height of the leg(s) 307 and/or 308 will also vary. Thus, the leg(s) 307 and/or 308 may be cut in the field and custom-fitted to the specific installation.

The drain pan 300 may include one or more sockets which are configured to receive the leg(s) 307 and/or 308. For example, as illustrated in FIG. 2, the drain pan 300 may include a first socket 301 and a second socket 302. As illustrated in FIG. 2, the socket(s) 301 and/or 302 may be positioned opposite the plenum 200 along the transverse direction T. For example, the plenum 200 may be positioned at a first transverse end of the drain pan 300 and the socket(s) 301/302 may be positioned opposite the plenum 200 at or near a second transverse end of the drain pan 300. Also as may be seen in FIG. 2, in some embodiments the drain pan 300 may also or instead include one or more of the sockets 301 and/or 302 at the other end of the pan 300, e.g., proximate the plenum 200. In various embodiments, one or both of the sockets 301 and 302 may be provided. In some embodiments, each socket 301 and 302 may be one of a pair of matching shaped sockets which are spaced apart along the lateral direction L and aligned along the transverse direction T.

The material for the leg(s) 307 and/or 308 may be any suitable material which is strong enough to bear the weight of the housing 114 and drain pan 300. For example, materials which are likely to be readily available during installation of the air conditioner unit and which can be suitable for forming the leg(s) 307 and/or 308 include building materials such as lumber, e.g., dimensional lumber such as a nominal two-inch-by-four-inch board, commonly referred to as a two-by-four, or plumbing, e.g., PVC piping having sufficient size (e.g., outer diameter, wall thickness, etc.). Thus, in some embodiments, the socket, e.g., first socket 301, may have a rectangular cross-section and may thereby be configured to receive a leg 307 made of lumber, such as a two-by-four leg, a two-by-six leg, or a four-by-four leg, etc. Additionally, in some embodiments, the socket, e.g., the second socket 302, may be cylindrical and may thereby be configured to receive a round, e.g., cylindrical, leg 308, such as a piece of piping, e.g., a PVC pipe as mentioned above, or, as another example, a steel pipe or other tubular or solid round leg 308.

Figure 3:
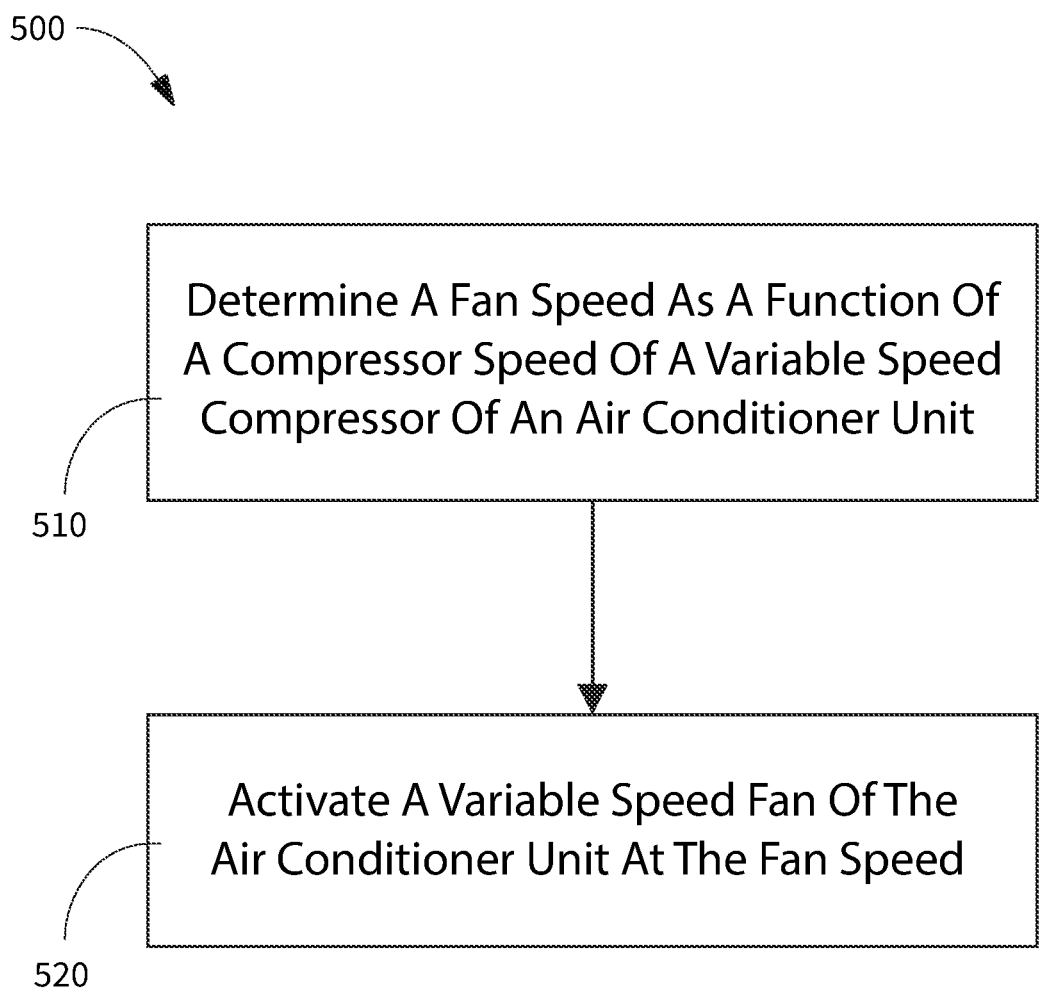
FIG. 3 provides a flowchart illustrating an example method of operating an air conditioner unit according to one or more example embodiments of the present disclosure.

Turning now to FIG. 3, embodiments of the present disclosure also include methods of operating an air conditioner unit such as method 500 illustrated in FIG. 3, where the air conditioner unit may be, e.g., the air conditioner unit 100 illustrated in FIGS. 1 and 2 and described above.

As illustrated in FIG. 3, the method 500 may include a step 510 of determining a fan speed as a function of a compressor speed of a variable speed compressor of the air conditioner unit. For example, the determined fan speed may be based on and/or proportional to the compressor speed. Method 500 may, in at least some embodiments, further include a step 520 of activating a variable speed fan of the air conditioner unit at the determined fan speed. For example, the variable speed fan may be one of the indoor fan 142 or the outdoor fan 124 shown in FIG. 2 and described above. Further, in some embodiments, step 510 of determining the fan speed may include determining an indoor fan speed as a first function of the compressor speed and determining an outdoor fan speed as a second function of the compressor speed, and the step 520 of activating the variable speed fan may include activating the indoor fan at the indoor fan speed and activating the outdoor fan at the outdoor fan speed.

In some embodiments, the fan speed may be a linear function of the compressor speed, such as a slope-intercept function or linearly interpolated from an array of values. Thus, for example, determining the fan speed may include calculating the fan speed based on the compressor speed using a slope-intercept formula. Those of ordinary skill in the art will recognize that slope-intercept equations generally follow the form of y=mx+b, where m is the slope term and b is the intercept term. Thus, for example, the fan speed may be determined using a slope-intercept formula such as Fan Speed=Slope*Compressor Speed+Intercept. As another example, determining the fan speed as a linear function of the compressor speed may include interpolating the fan speed from an array of fan speed values based on the compressor speed, e.g., where each fan speed value in the array corresponds to a respective compressor speed, the fan speed may be interpolated between two proximate, e.g., adjacent, fan speed values in the array based on the compressor speed when the compressor speed is between the two respective compressor speed values that correspond to the two proximate fan speed values.

In some embodiments, the compressor speed may be an actual, current operating speed of the variable speed compressor. For example, the method may also include a step of activating the variable speed compressor at the compressor speed, e.g., prior to determining the fan speed. The fan speed may then be determined as a function of the compressor speed at which the compressor was activated.

In some embodiments, the compressor speed may be a target compressor speed value. For example, when the variable speed compressor is accelerating or decelerating to match the target compressor speed value based on the current call for heating or cooling, the fan may be operated based on the target or desired compressor speed, which may advantageously reduce oscillations in the fan speed. Thus, in such embodiments, the method may include determining a target compressor speed, such as in response to an input and/or call for heating or cooling from a user interface, e.g., thermostat, and then determining the fan speed based on, e.g., as a function of, the target compressor speed.

Also by way of example, the compressor speed may be measured based on a power draw by the compressor. Thus, the method may include measuring a power draw of the compressor, defining a compressor speed value based on the measured power draw of the compressor, and determining the fan speed as a function of the defined compressor speed value. In other embodiments, the compressor speed may be a predetermined compressor speed, e.g., stored in a memory of the controller of the air conditioner unit. For example, when the compressor is not activated, such as when the air conditioner unit is operating in a user-selected fan only mode or in an electric heat mode, the compressor speed may be a stored value. In such exemplary embodiments, the method 500 may further include receiving, from a user interface of the air conditioner unit, a fan only mode selection input, and the compressor speed of which the fan speed is a function may be a minimum compressor speed value stored in the memory of the controller.

In some embodiments, the method 500 may include determining a state or mode of the air conditioner unit, such as a sealed system thereof, e.g., prior to determining the fan speed. Thus, for example, the method may include determining the fan speed using a first function when the air conditioner unit is in cooling mode, a second, different, function when the air conditioner unit is in heating (heat pump) mode, and/or using a predetermined compressor speed when the unit is in fan only mode (as mentioned above). Additionally, in some embodiments, the determination of the fan speed may also be based on a fan speed setting, e.g., a user-selected fan speed setting. Thus, the first function may be used when the air conditioner unit is in cooling mode and the fan speed setting is high, whereas an offset may be applied to the high-speed setting value determined by the first function when the fan speed setting is low in cooling mode. Similarly, the second function may be used when the unit is in heat pump mode and the fan setting is high, whereas an offset may be applied to the high-speed setting value determined by the second function when the fan speed setting is low in heat pump mode. Additionally, the relationship may be reversed, e.g., the first function and the second function may be used when the fan speed is set to low and the offset may be applied to each respective function when the fan speed is set to high.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an air conditioner unit, the method comprising:
    determining a fan speed as a function of a compressor speed of a variable speed compressor of the air conditioner unit, wherein determining the fan speed as a function of the compressor speed comprises determining a high fan speed as a linear function of the compressor speed when a fan mode is set to a high speed mode and determining a low fan speed by applying an offset to the high fan speed when the fan mode is set to a low speed mode; and
    activating a variable speed fan of the air conditioner unit at the fan speed.

2. The method of claim 1, wherein determining the fan speed as the linear function of the compressor speed when the fan mode is set to the high speed mode comprises calculating the fan speed based on the compressor speed using a slope-intercept formula.

3. The method of claim 1, wherein determining the fan speed as the linear function of the compressor speed when the fan mode is set to the high speed mode comprises linearly interpolating the fan speed from an array of fan speed values.

4. The method of claim 1, wherein determining the fan speed as the linear function of the compressor speed when the fan mode is set to the high speed mode comprises measuring a power draw of the compressor, defining a compressor speed value based on the measured power draw of the compressor, and determining the fan speed as a linear function of the defined compressor speed value.

5. The method of claim 1, wherein determining the fan speed as the linear function of the compressor speed when the fan mode is set to the high speed mode comprises determining the fan speed as a first linear function of the compressor speed when a sealed system of the air conditioner unit is set to cooling mode and determining the fan speed as a second linear function of the compressor speed when the sealed system is set to heat pump mode.

6. The method of claim 1, wherein the compressor speed is a target compressor speed of the variable speed compressor.

7. The method of claim 1, further comprising receiving, from a user interface of the air conditioner unit, a fan only mode selection input, wherein the compressor speed is a minimum compressor speed value.

8. The method of claim 1, wherein the air conditioner unit comprises an outdoor heat exchanger assembly comprising an outdoor heat exchanger and an outdoor fan and an indoor heat exchanger assembly comprising an indoor heat exchanger and an indoor fan, wherein the variable speed compressor is in fluid communication with the outdoor heat exchanger and the indoor heat exchanger whereby the variable speed compressor circulates a refrigerant between the outdoor heat exchanger and the indoor heat exchanger when the variable speed compressor is activated, wherein determining the fan speed as the linear function of the compressor speed when the fan mode is set to the high speed mode comprises determining an indoor fan speed as a first linear function of the compressor speed and determining an outdoor fan speed as a second linear function of the compressor speed, and wherein activating the variable speed fan comprises activating the indoor fan at the indoor fan speed and activating the outdoor fan at the outdoor fan speed.

9. An air conditioner unit, comprising:
a housing defining an outdoor portion and an indoor portion;
an outdoor heat exchanger disposed in the outdoor portion;
an indoor heat exchanger disposed in the indoor portion;
a variable speed compressor in fluid communication with the outdoor heat exchanger and the indoor heat exchanger to circulate a refrigerant between the outdoor heat exchanger and the indoor heat exchanger; and
a controller, the controller configured for:
determining a fan speed as a function of a compressor speed of the variable speed compressor of the air conditioner unit, wherein determining the fan speed as a function of the compressor speed comprises determining a high fan speed as a linear function of the compressor speed when a fan mode is set to a high speed mode and determining a low fan speed by applying an offset to the high fan speed when the fan mode is set to a low speed mode; and
activating a variable speed fan of the air conditioner unit at the fan speed.

10. The air conditioner unit of claim 9, wherein determining the fan speed comprises as the linear function of the compressor speed when the fan mode is set to the high speed mode calculating the fan speed based on the compressor speed using a slope-intercept formula.

11. The air conditioner unit of claim 9, wherein determining the fan speed as the linear function of the compressor speed when the fan mode is set to the high speed mode comprises linearly interpolating the fan speed from an array of fan speed values.

12. The air conditioner unit of claim 9, wherein determining the fan speed as the linear function of the compressor speed when the fan mode is set to the high speed mode comprises measuring a power draw of the compressor, defining a compressor speed value based on the measured power draw of the compressor, and determining the fan speed as a linear function of the defined compressor speed value.

13. The air conditioner unit of claim 9, wherein determining the fan speed as the linear function of the compressor speed when the fan mode is set to the high speed mode comprises determining the fan speed as a first linear function of the compressor speed when a sealed system of the air conditioner unit is set to cooling mode and determining the fan speed as a second linear function of the compressor speed when the sealed system is set to heat pump mode.

14. The air conditioner unit of claim 9, wherein the controller is further configured for determining a target compressor speed, and wherein the compressor speed is the determined target speed of the variable speed compressor.

15. The air conditioner unit of claim 9, wherein the controller is further configured for receiving, from a user interface of the air conditioner unit, a fan only mode selection input, wherein the compressor speed is a minimum compressor speed value stored in a memory of the controller.

16. The air conditioner unit of claim 9, further comprising an outdoor heat exchanger assembly comprising the outdoor heat exchanger and an outdoor fan and an indoor heat exchanger assembly comprising the indoor heat exchanger and an indoor fan, wherein the variable speed compressor is in fluid communication with the outdoor heat exchanger and the indoor heat exchanger whereby the variable speed compressor circulates the refrigerant between the outdoor heat exchanger and the indoor heat exchanger when the variable speed compressor is activated, wherein determining the fan speed as the linear function of the compressor speed when the fan mode is set to the high speed mode comprises determining an indoor fan speed as a first linear function of the compressor speed and determining an outdoor fan speed as a second linear function of the compressor speed, and wherein activating the variable speed fan comprises activating the indoor fan at the indoor fan speed and activating the outdoor fan at the outdoor fan speed.

* * * * *